(12) United States Patent
Tupakula et al.

(10) Patent No.: US 11,010,430 B1
(45) Date of Patent: May 18, 2021

(54) CREATING RESULTS PAGE COHESION BASED ON RESULTS URLS

(71) Applicant: Microsoft Technology Licensing, LLC, Redmond, WA (US)

(72) Inventors: Pranathi Reddy Tupakula, Cumming, GA (US); Brian Thomas Schwartz, Bellevue, WA (US); Vaibhav Girish Parikh, Bothell, WA (US); Marcelo De Barros, Redmond, WA (US); Ramkrishna Khoso, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/675,909

(22) Filed: Nov. 6, 2019

(51) Int. Cl.
| | |
|---|---|
| *G06F 16/9035* | (2019.01) |
| *G06F 16/955* | (2019.01) |
| *G06F 16/9538* | (2019.01) |
| *G06F 16/957* | (2019.01) |
| *G06F 16/9535* | (2019.01) |

(52) U.S. Cl.
CPC ........ *G06F 16/9035* (2019.01); *G06F 16/957* (2019.01); *G06F 16/9535* (2019.01); *G06F 16/9538* (2019.01); *G06F 16/9566* (2019.01)

(58) Field of Classification Search
CPC ............. G06F 16/9035; G06F 16/9535; G06F 16/9566; G06F 16/9538; G06F 16/957
See application file for complete search history.

(56) References Cited

U.S. PATENT DOCUMENTS

| | | | |
|---|---|---|---|
| 2009/0157640 A1* | 6/2009 | Signorini | G06F 16/353 |
| 2012/0323888 A1* | 12/2012 | Osann, Jr. | G06F 16/248 |
| | | | 707/722 |
| 2013/0311458 A1 | 11/2013 | Goel et al. | |
| 2015/0161131 A1 | 6/2015 | Provine | |
| 2016/0048556 A1* | 2/2016 | Kelly | G06Q 30/02 |
| | | | 707/767 |
| 2016/0335264 A1 | 11/2016 | Behal et al. | |

OTHER PUBLICATIONS

"International Search Report and Written Opinion Issued in PCT Application No. PCT/US20/056229", dated Jan. 14, 2021, 10 Pages.

* cited by examiner

*Primary Examiner* — Pei Yong Weng
(74) *Attorney, Agent, or Firm* — Medley, Behrens & Lewis, LLC

(57) ABSTRACT

A user submits a query to a search system that produces a search results page having one or more segments and a plurality of URLs relevant to the query. Embodiments of the disclosure ensure cohesion between the URLs and the segments on the search results page by evaluating each segment relative to the URLs. A relevancy score is calculated for each segment based on the URLs. The relevancy score for each segment is compared to one or more thresholds. Depending on whether the relevancy score for each segment exceeds one or more thresholds, the segment can be eliminated from the search page, relocated on the search page, or left alone. Calculation of each relevancy score is based on information determined from a search log. A feedback loop can help improve the functioning of the suppression and/or relocation functions.

20 Claims, 10 Drawing Sheets

CREATING RESULTS PAGE COHESION BASED ON RESULTS URLS

FIELD

This application relates generally to search techniques. More specifically, this application relates to automatic rearrangement and suppression of results page elements based on the results Uniform Resource Locators (URLs) returned in response to a user query.

BACKGROUND

As search services have become more sophisticated, the results pages that are returned in response to a user query have changed from a simple list of URL links to a results page having some areas where information that may be of most interest to a user can be presented as well as a general results section where links to web sites and other information relevant to the user query can be presented.

It is within this context that the present embodiments arise.

DETAILED DESCRIPTION

Figure 1:
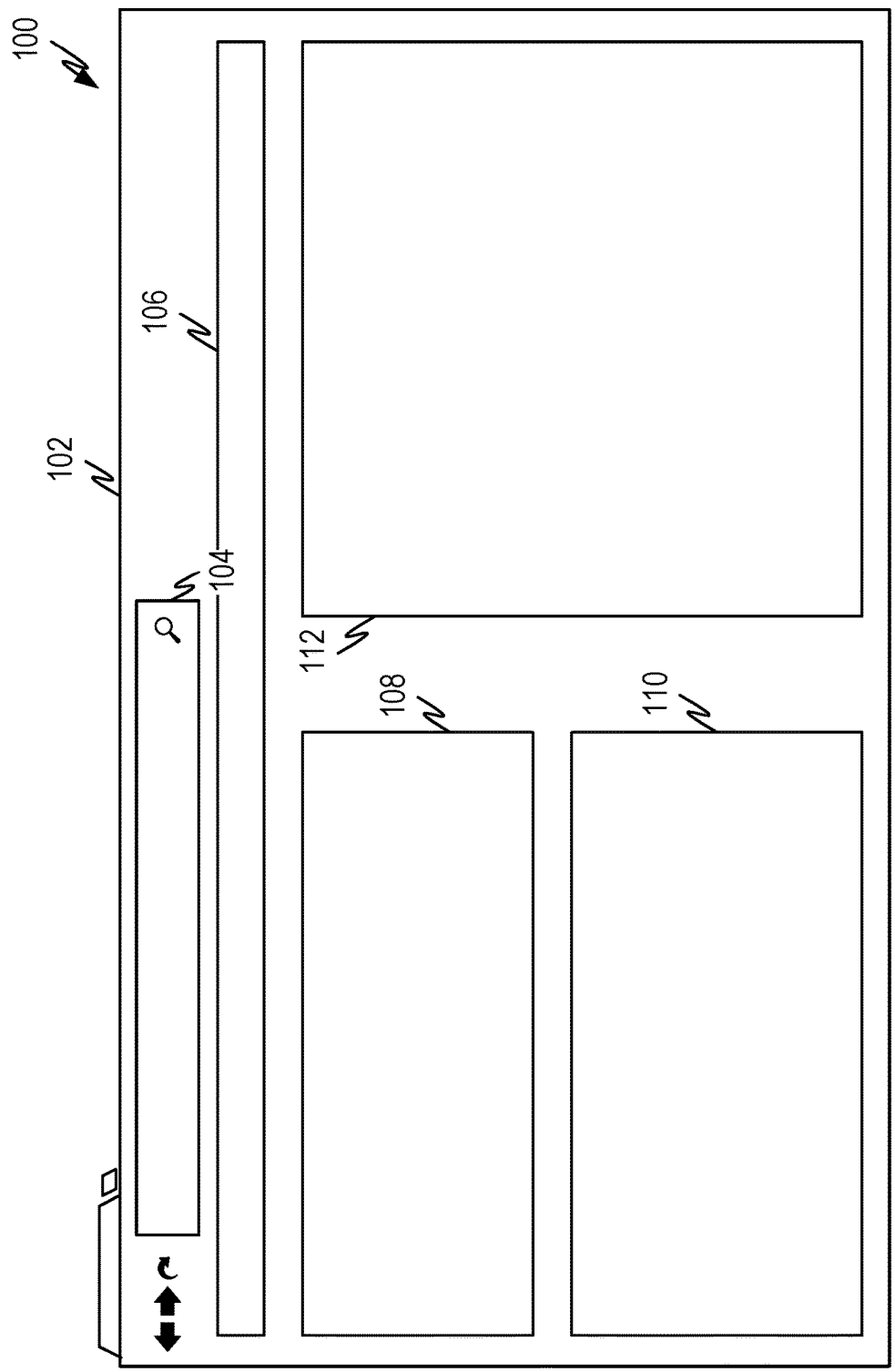
FIG. 1 illustrates a prior art example of a search results page having different areas where different types of results information can be presented.

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Overview

The following overview is provided to introduce a selection of concepts in a simplified form that are further described below in the Description. This overview is not intended to identify key features or essential features of the claimed subject matter, nor is it intended to be used to limit the scope of the claimed subject matter. Its sole purpose is to present some concepts in a simplified form as a prelude to the more detailed description that is presented later.

As search services have become more sophisticated, the results pages that are returned in response to a user query have changed from a simple list of URL links to a results page having some areas where information that may be of most interest to a user can be presented as well as a general results section where links to web sites and other information relevant to the user query can be presented. The information that can be placed in these areas are referred to herein as segments, and often contain quick answers and/or information related to a particular category of information. For example, if a user enters "how high is Mount Everest," as a search query, one segment may show the answer to the user's question. Additionally, or alternatively, other segments may contain information related to Mount Everest, such as images of Mount Everest, news about Mount Everest, and so forth. Additionally, the results page can comprise the search results comprising links to websites and other locations that are relevant to the user's query.

Such a system works well when the query is not very ambiguous, such as the "how high is Mount Everest" query above. However, some queries are ambiguous in that they can have several meanings. It can be difficult to ascertain the user intent behind the query and the segment sections of the web page can be from one intent while the URLs in the search result section can be from another intent. This results in a situation where one or more segments are inconsistent with the search results and the results page lacks cohesion.

Embodiments of the present disclosure ensure whole page cohesion in results pages by eliminating segments or reducing the prominence of segments that aren't particularly coherent when evaluated in light of the search results. This is accomplished through a two-phase process. The first phase of the process occurs offline, meaning it does not need to happen within the turn around time from query submission to results page presentation. The second phase of the process occurs in real-time meaning that it occurs within the turn around time from query submission to results page presentation. The second phase utilizes information obtained from the offline process to evaluate the cohesion of the various segments relative to the search results and making adjustments to the results page to ensure cohesion between the search results and segments on the results page. Cohesion is ensured by eliminating and/or reducing the prominence of segments based on the degree of cohesion between the segments and the search results.

These and other aspects are explained more fully below.

Description

FIG. 1 illustrates a prior art example 100 of a search results page having different areas where different types of results information can be presented. The results page is presented within a user interface 102. Such a user interface comprises various user interface controls and other mechanisms to interact with a search service and/or control operation of the program used to interact with the search service.

In practice, a user enters a query in a control 104 designed to allow a user to enter a query and submit the query to the search service. In response, the search service returns a results page that is presented to the user via the user interface 102.

The results page comprises various areas where information is presented to the user and/or has controls to allow the user to manipulate the results page. For example, the results page can comprise one or more of: an area 106 where user interface controls are presented to allow a user to manipulate the results page; one or more areas 108, 112 where information related to one or more segments can be presented; and an area 110 where the main search results are presented.

As used herein, the term segment(s) refers to information presented to a user in a results page in addition to the search results. Segments typically package information that is likely to be most relevant to a user and places it in prominent locations, such as 108 and/or 112. As an example, a segment can present one or more quick answers to a user. Quick answers are information that directly answers a submitted query. For example, in response to "what is the stock price for General Motors?" a segment can present the quick answer showing the current stock price for General Motors. Other segments can present information related to General Motors such as a quick summary of the history of the company. These would typically be presented in areas such as 108 and/or 112 which are prominent in order to place the information The search results are typically presented below or alongside the segment information, such as in area 112. The search results would contain websites and other resources where information relevant to the query can be found.

As explained below, segments typically have different triggering models and when the intent of a query is ambiguous, the segments selected for presentation as part of a results page can lack cohesion with the search results. For example, consider the query "Chicago plays." The query could have a sports intent, looking for information related to one or more of the Chicago sports teams. The query could also have a theater intent, looking for theatrical plays in the Chicago area. In such a situation, one of the segments may contain information related to the schedule of one or more of the Chicago sports teams while the search results can be information regarding theatrical plays in the Chicago area. The prior art would simply present these two aspects together on the results page. Thus, prior art search results pages can lack cohesion, meaning that all information on the page is drawn from the same intent.

Figure 2:
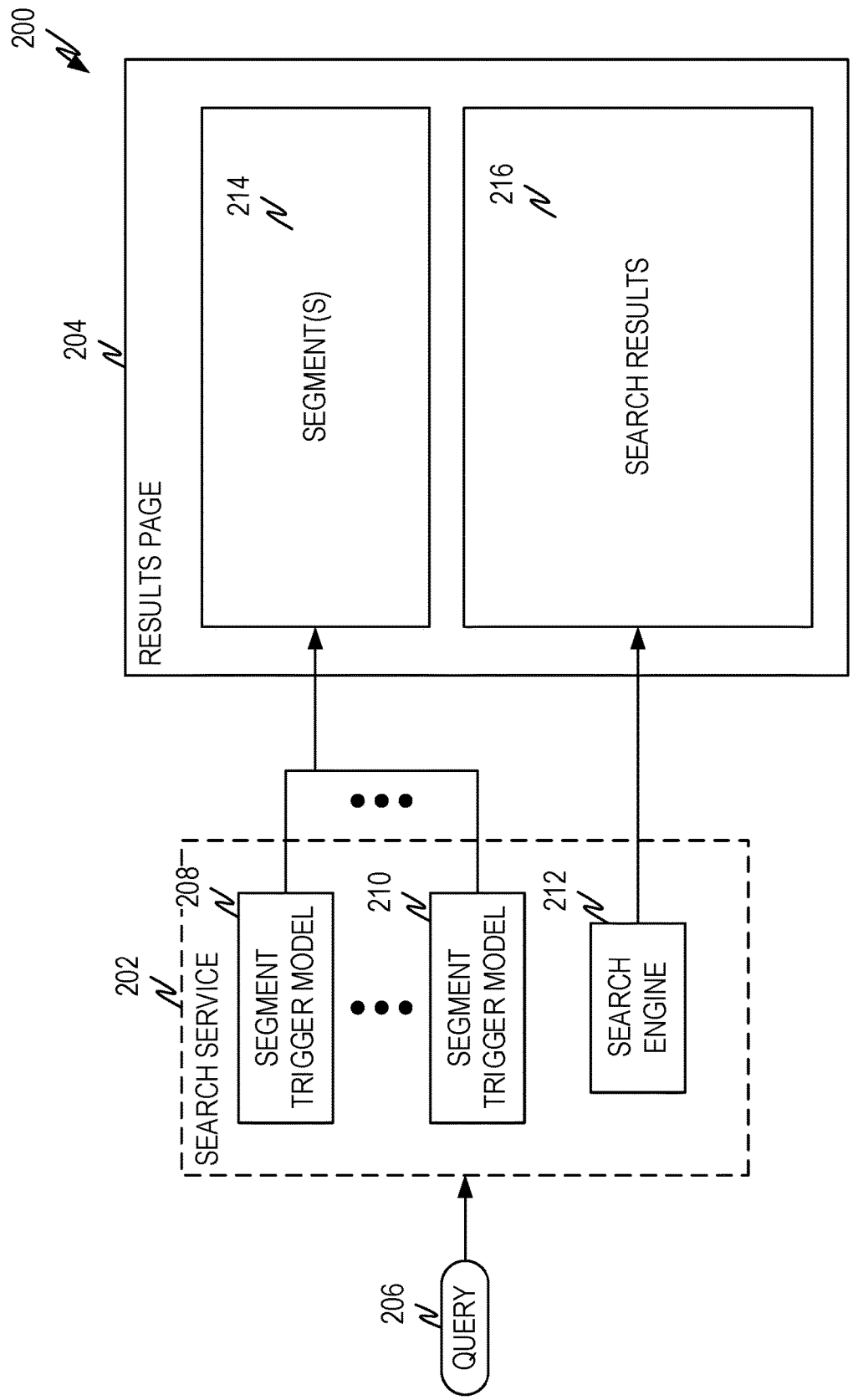
FIG. 2 illustrates a conceptual representation of how different areas of a results page are filled according to some aspects of the present disclosure.

FIG. 2 illustrates a conceptual representation 200 of how different areas of a results page are filled according to some aspects of the present disclosure. A query 206 is submitted to a search service 202. The search service 202 has one or more segments, each with a trigger model 208, 210 that evaluate the query and/or other information. The trigger model 208, 210 for a segment determines whether the segment has relevant information to contribute to the results page 204. The trigger models 208, 210 can determine whether to trigger based on a measure of relevance of the segment to the intent of the query 206. Trigger in this context simply means that the segment has information that it wants to contribute to one or more segment sections 214 on the results page 204. If more segments trigger than there is space to place the information on the results page 204, a selection process can be used to select which segment(s) should be included on the results page 204.

Additionally, the search engine 212 and other aspects of the search service 202 can produce search results for inclusion on the results page 204 in an area 216. In this context, the search results are the URLs and other information that are relevant to the query 206.

The results page 204 is examined by embodiments of the present disclosure to determine whether the segment(s) 214 are consistent with the search results 216 so that a presented results page maintains cohesion. Segment(s) 214 that are not consistent with the search results 216 can be suppressed. Additionally, or alternatively, segment(s) 214 that are not consistent with the search results 216 can be relocated to a less prominent location on the results page 204. Finally, segment(s) 214 that are consistent with the search results 216 can be left alone without change.

Thus, embodiments of the present disclosure adjust the results page to maintain page cohesion between the search results 216 and the segments 214.

Figure 3:
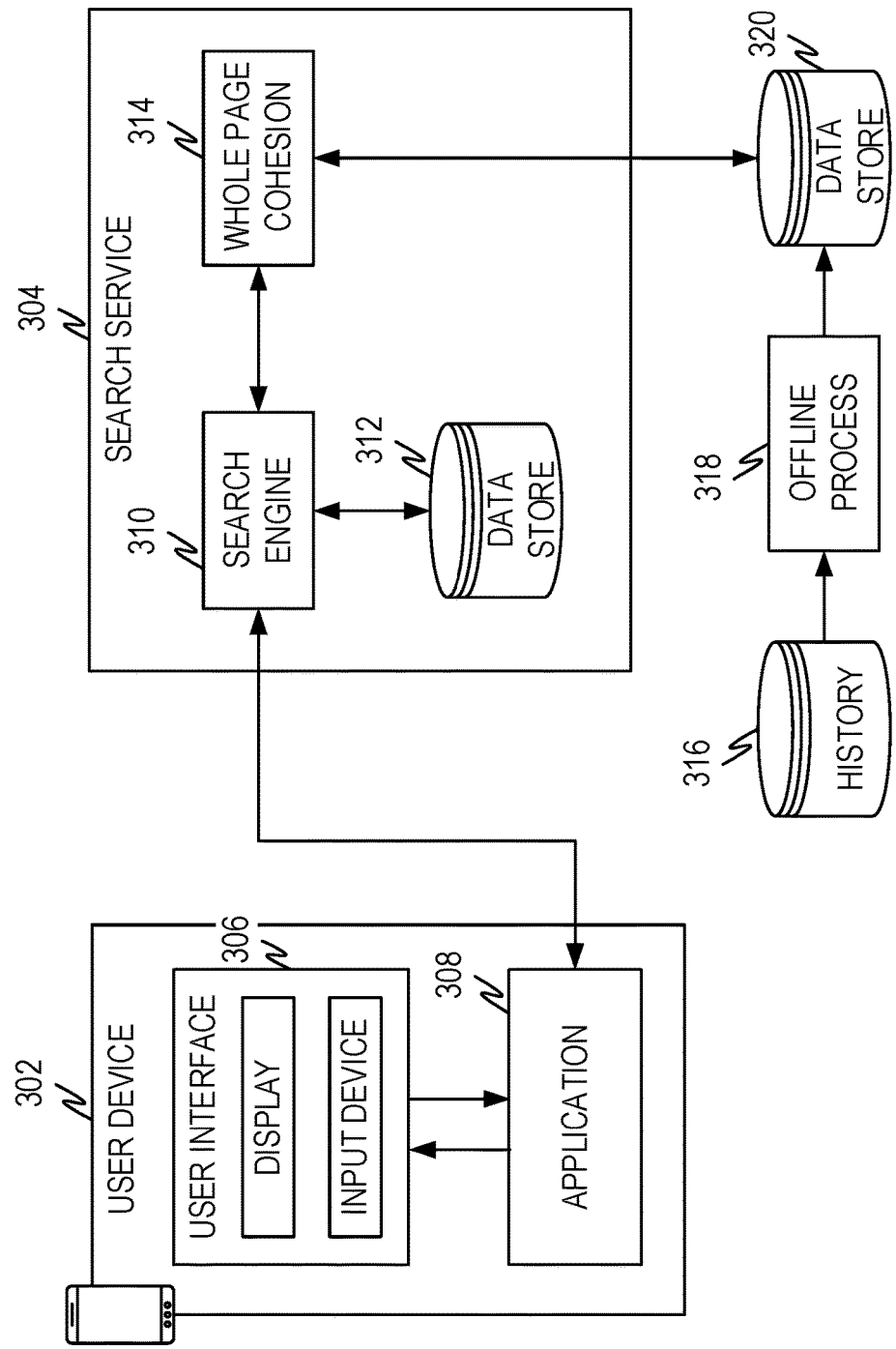
FIG. 3 illustrates an example architecture according to some aspects of the present disclosure.

FIG. 3 illustrates an example architecture 300 according to some aspects of the present disclosure. The architecture 300 is a high-level view of a search service 304 that incorporates processes for ensuring whole page cohesion 314. In some instances, the search service 304 is implemented as a search system. However, in this disclosure, no distinction between search services and search systems is made and all will be referred to as search services.

The principles of the disclosure can be incorporated into the search service 304 so that the output of the search service 304 has whole page cohesion. Additionally, or alternatively, embodiments of the present disclosure can be a separate entity that processes the search results page according to the disclosure herein. In these latter embodiments, the output of the search service 304 would be processed and the processed output returned to the user.

A user typically interacts with a search service 304 using a user device 302. The user device 302 can be any type of device that interacts with search service 304 such as a mobile phone or other mobile device, a wearable device, a laptop, desktop, or other computer system, an Internet of Things (IoT) device, a slate device, and so forth. The user device 302 has a user interface 306 that typically is presented on a display and the user interacts with the user interface 306 using some sort of input device such as a mouse, pen, touch screen, and so forth. However, for some devices users can interact with the user device 302 using natural interface mechanisms such as voice, gestures, and so forth.

The user device typically interacts with the search service using an application 308 such as a browser or other application, although in some embodiments, the device 302 can interact with the search service 304 without the aid of a separate application 308 such as when such functionality is built into an operating system of the device 302.

The user submits a query to the search service 304 via the user device. The search service 304 receives the query and a search engine 310 produces a search results page, e.g., using one or more data stores 312 such as is known. The search results page is examined by the whole page cohesion system 314 and adjustments are made to the search results page to ensure whole page cohesion as explained herein. In evaluating the search results page for whole page cohesion, the whole page cohesion system 314 can utilize information that has been created by an offline process 318 from search logs 316 and stored in one or more data stores 320. The details of how the offline process 318 works and the resultant information is produced and stored are described below. The operation of the whole page cohesion system 314 is also described below.

Once the adjustments to the results page are made, the results page is returned to the user device 302 where it is presented to the user.

Figure 4:
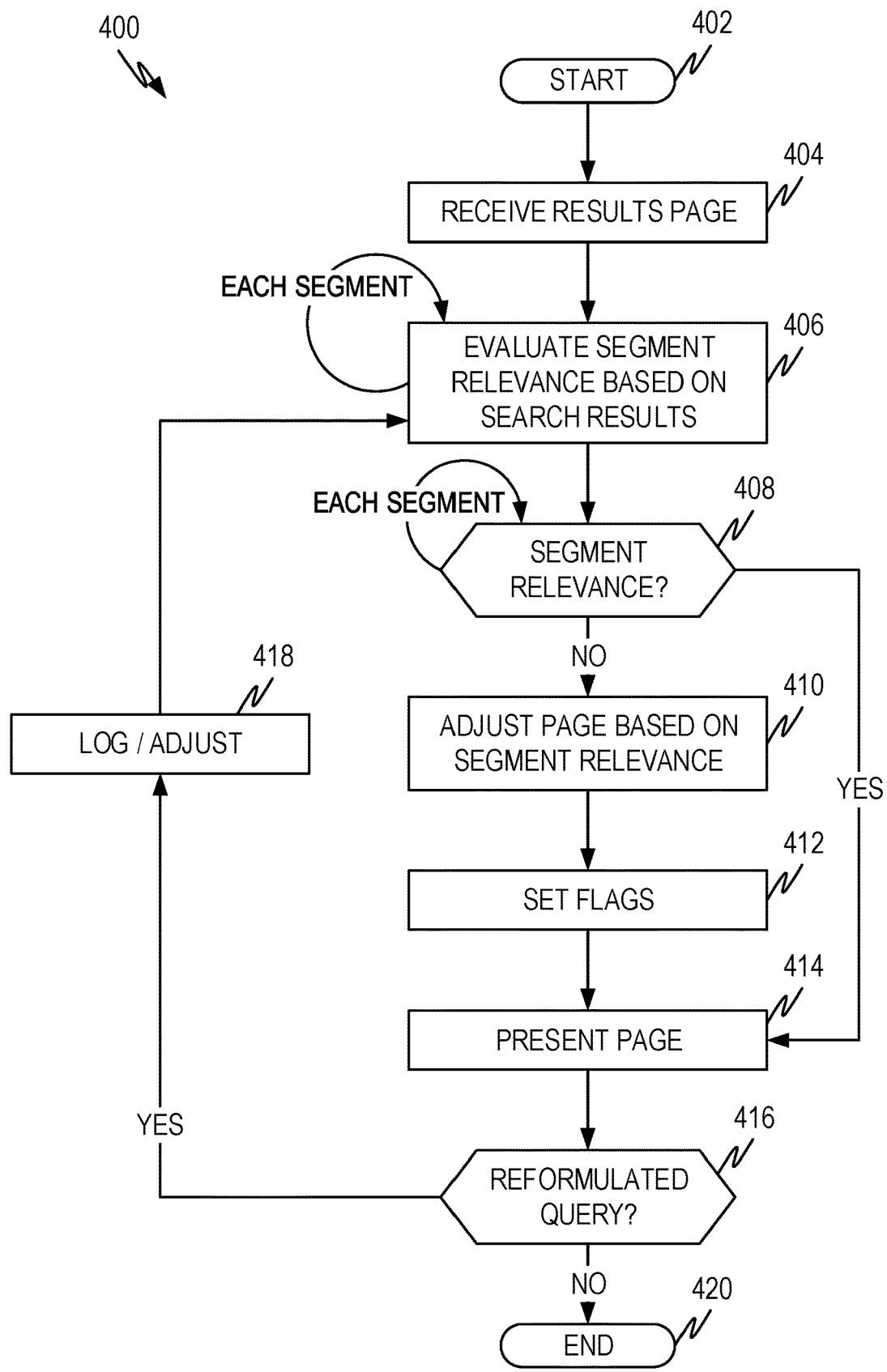
FIG. 4 illustrates an example conceptual flow diagram for maintaining whole page cohesion according to some aspects of the present disclosure.

FIG. 4 illustrates an example conceptual flow diagram 400 for maintaining whole page cohesion according to some aspects of the present disclosure. This conceptual flow diagram 400 gives a high-level overview of the various aspects of embodiments of the present disclosure to provide a context showing how all the various aspects work together for embodiments of the present disclosure.

The diagram starts at operation 402 and proceeds to operation 404 where a results page is received from a search service. As noted herein (e.g., FIG. 2), the results page can comprise one or more segments and a plurality of URLs that comprise the main set of search results. To maintain whole page cohesion, the segments that are displayed should "make sense" in light of the displayed search results and/or be consistent with the search results.

Operation 406 evaluates each segment in light of the search results and ascertains whether the segment has relevance with the search results so that whole page cohesion can be maintained. How operation 406 works is explained in detail below.

Operation 408 takes actions based on the relevance of each segment to the search results. If a segment is relevant, such as from the relevance of the segment passing a threshold value, the "Yes" branch of operation 408 is taken for that segment and no change is made to that segment, other than a possible slight adjustment in the location of the segment depending on whether other segments have been suppressed and/or relocated.

If a segment has relevance lower than a threshold value, the segment can be suppressed so that it will not be shown at all. In this instance, the "No" branch from operation 408 can be taken for that segment and operation 410 will suppress the segment and, in some instances, make other adjustments to the results page based on the segment being suppressed.

If a segment has some relevance, such as determined by the relevance passing a first threshold but not a second threshold, the "No" branch from operation 408 can be taken for that segment and operation 410 will relocate the segment so that it is still part of the results page, but will not have a place of prominence on the results page. Operation 410 can make other adjustments to the results page in some instances based on the segment being relocated.

Operation 412 sets flags that indicate what actions have been taken to preserve the state of what was done so that it can be evaluated in light of subsequent actions taken by the user. For example a "didSupress" flag can be set for those segments that were suppressed. Additionally, or alternatively, a "didRelocate" flag can be set for those segments that were relocated. These flags can be used in conjunction with a reformulated query to improve operation of the system as explained in greater detail below.

Operations 408, 410, and/or 412 are repeated for each of the segments, so that all adjustments are made, all appropriate flags are set prior to the results page being presented to the user. Operation 414 causes presentation of the results page to the user, such as by returning the results page to the user device for display to the user.

Operation 416 watches what the user does in response to the presented results page. If the user reformulates the query and resubmits the query, the presumption can be that the user did not find what they were looking for. Thus, the "Yes" branch from operation 416 leads to a log/adjust operation 418 which can log information for later evaluation, dynamically adjust thresholds or otherwise modify operation of the suppression/relocation logic in order to improve the functioning of the system.

Information that is logged can include any combination of the original query, the flags (e.g., didRelocate, didSuppress), the reformulated query, and/or any actions the user took before the reformulated query was submitted.

Additionally, or alternatively, if a segment is relocated (such as to the bottom of the results page, to a less prominent location, and/or so forth) and the user subsequently interacts with and/or otherwise expresses interest in the relocated segment, then the combination of a didRelocate flag and the interest/interaction can be used in operation 416 and/or operation 418 to evaluate whether the segment should have been relocated. Thus, appropriate information can be logged, thresholds adjusted, and/or other actions taken to modify operation of the relocation/suppression logic to improve operation of the system.

Thus, the combination of flags and/or subsequent user actions can operate as a feedback loop to improve operation of the system. As part of the feedback loop, operation 406 and/or subsequent operations can take into account what was done by the system in the past, what the user did, and modify operation of the system in conjunction with the determination.

Additionally, or alternatively, the adjustments, thresholds, decisions, and so forth can be modified based on customizations made for individual users, groups of users, and so forth. For example, if a user is known to have significant interest in sports, and the system would otherwise suppress a segment related to sports, the system may determine to leave the sports segment unsuppressed based on the known user interest. Thus, operation, thresholds, and so forth can be modified based on particular user profiles and/or other information known about the user.

Figure 5:
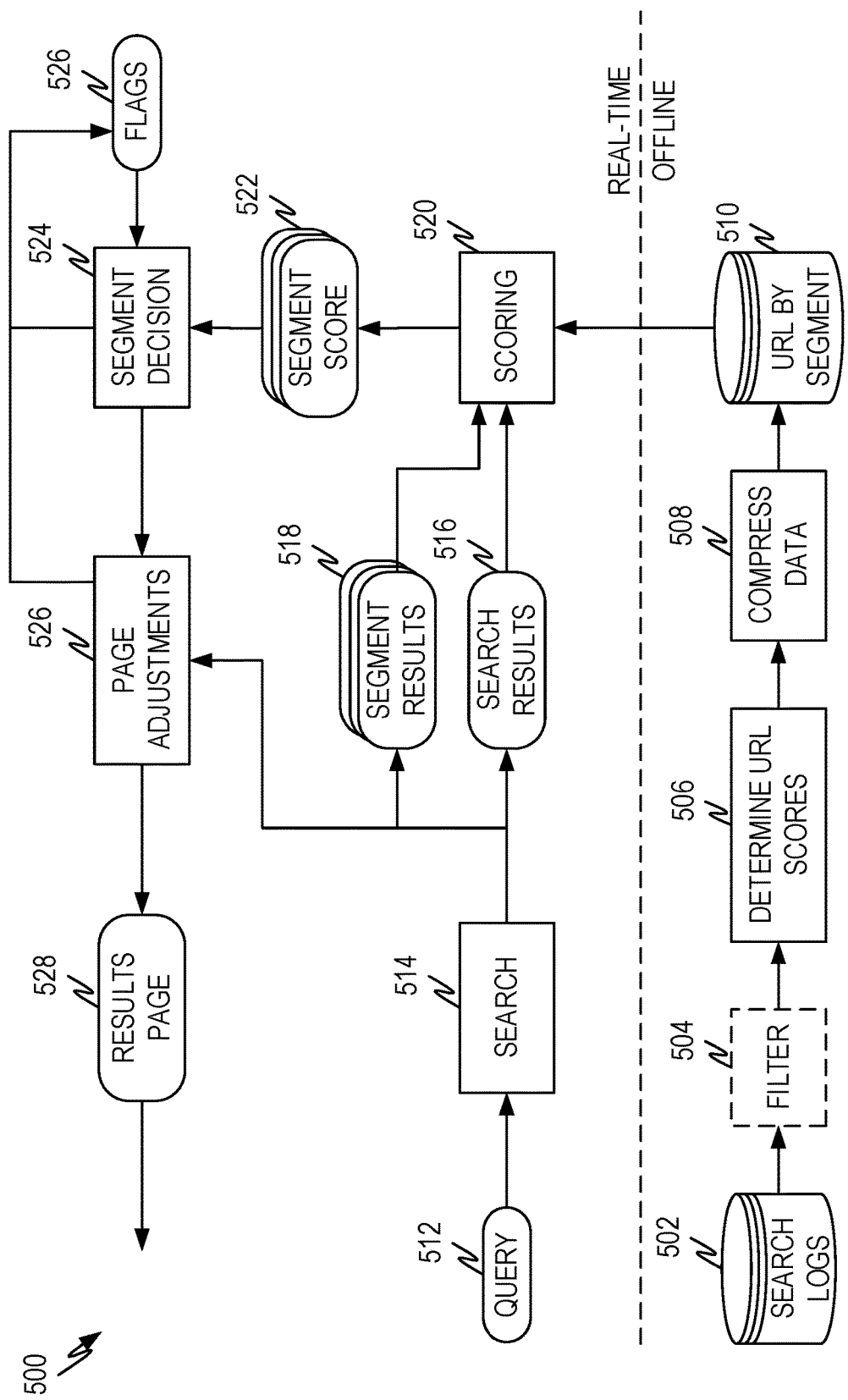
FIG. 5 illustrates an example architecture according to some aspects of the present disclosure.

FIG. 5 illustrates an example architecture 500 according to some aspects of the present disclosure. The architecture 500 illustrates two separate phases of operation, an offline operation and a real-time operation. As discussed herein, offline means that the that phase of operation takes place asynchronously with incoming queries and need not be completed within the request-response time of a query-results page loop. In contradistinction, real-time means that the operations take place within the request-response time of a query-results page loop.

Operation of the offline portion will be discussed first. The purpose of the offline portion of the architecture is to evaluate the information in search logs 502 and produce a set of URL scores by segment. A URL score indicates how relevant a URL is to a given segment as will be apparent from the disclosure herein.

Search logs 502 include information such as what queries have been submitted, the corresponding URLs produced in response to the query, actions taken by the user such as which URLs were clicked on, and so forth. In some search systems, the search logs 502 include information on condition that the user interacted with the results in some way. In these type of systems, if a query was submitted and results returned but the user did not interact with the query/results in any way, the query/results will not be logged. In other systems, logging occurs regardless of user interaction.

A segment of the search log 502 is selected for analysis. The segment can be selected based on any criterion and/or combination of criteria, such as the logs for some past time segment, a certain number of query/results, and so forth.

Filter(s) 504 can filter out queries and/or results URLs based on some criteria. For example, to reduce the "noise" in the data to be analyzed, some data can be dropped from consideration. For example, query-URL pairs that have below a certain number of clicks can be dropped. In one embodiment, query-URL pairs having below about 10 clicks can be dropped from consideration.

Figure 6:
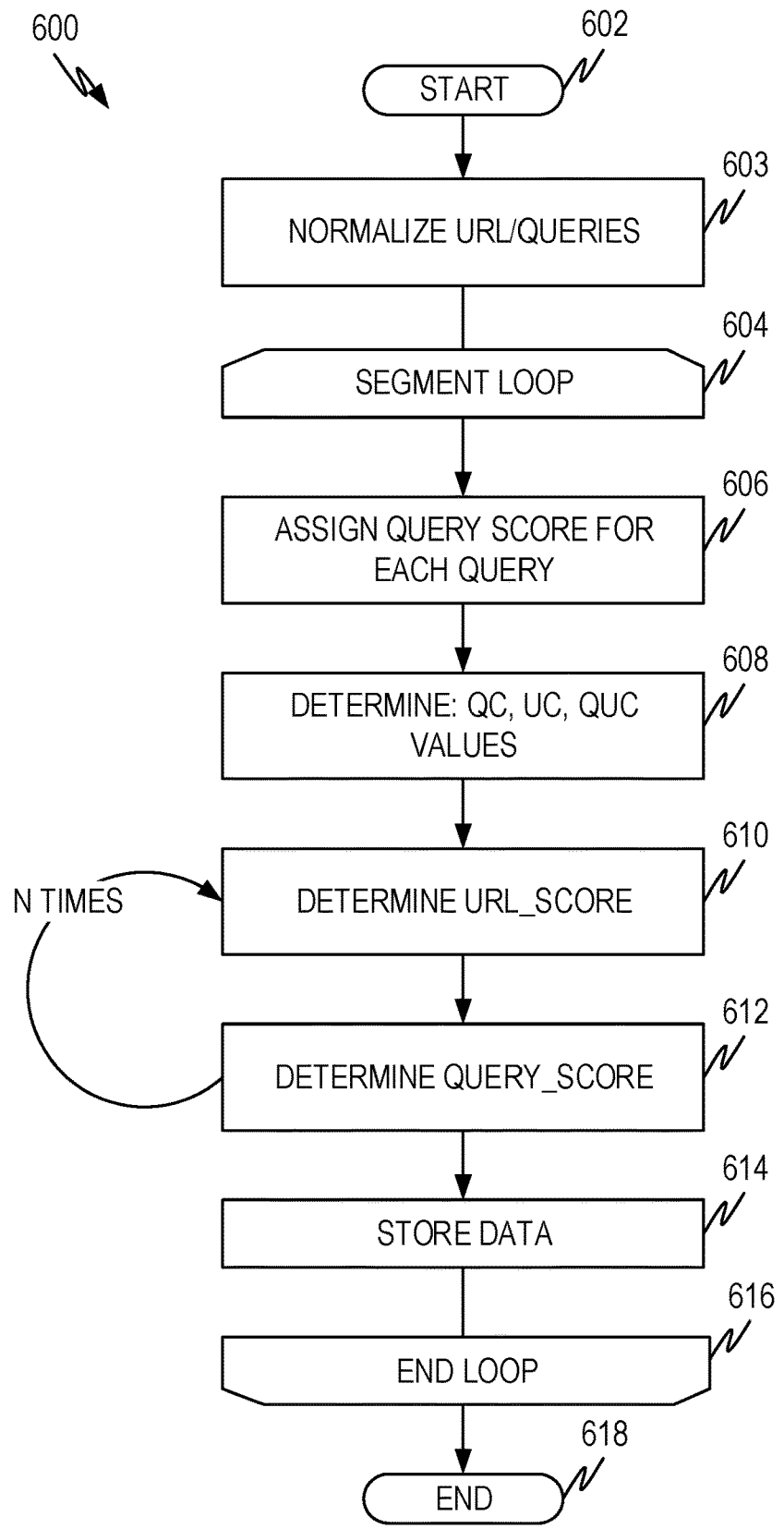
FIG. 6 illustrates an example flow diagram illustrating calculating URL scores according to some aspects of the present disclosure.
Figure 7:
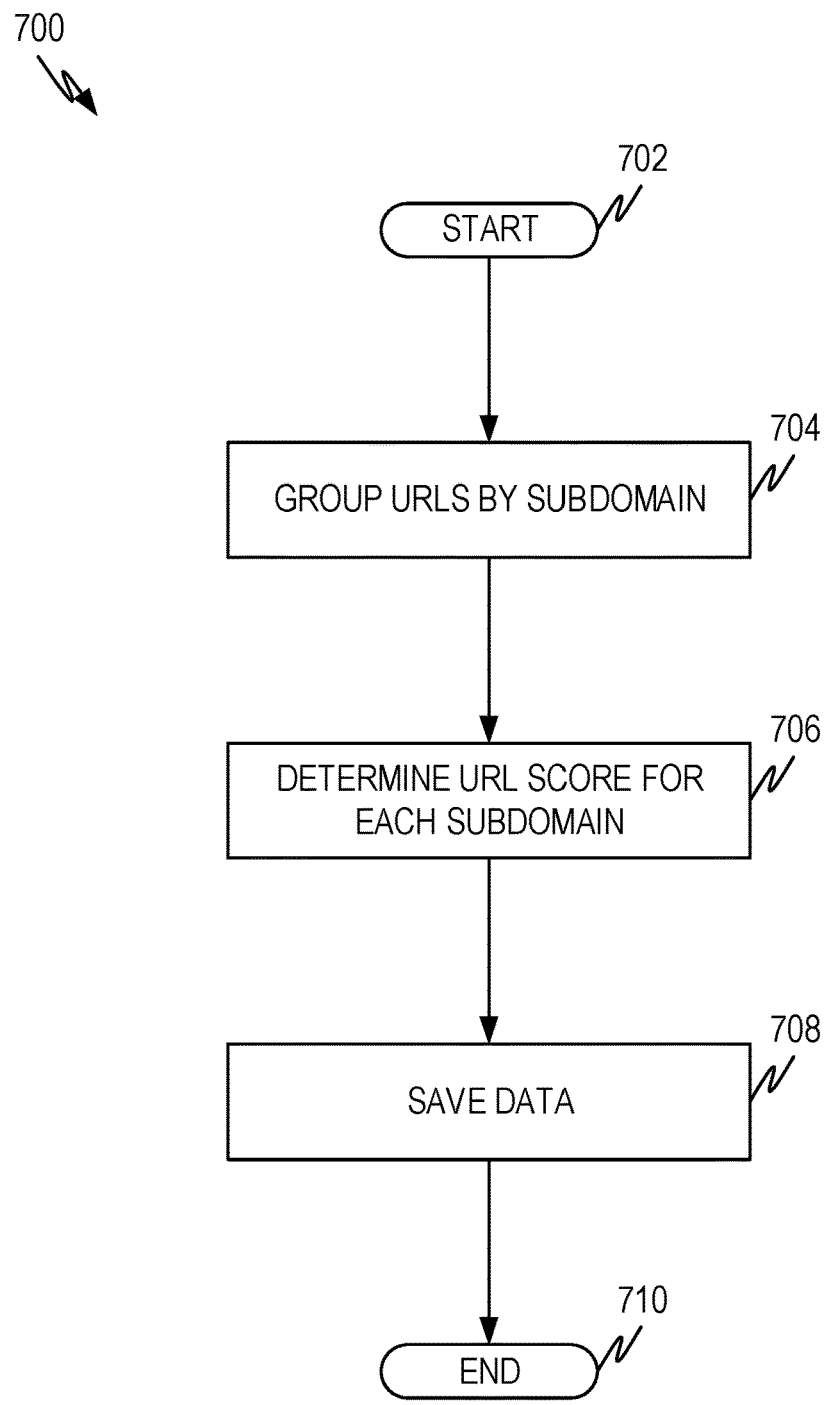
FIG. 7 illustrates an example flow diagram that accounts for new URLs according to some aspects of the present disclosure.

URL scores for each URL and segment are determined in process 506. An example way to determine URL scores is illustrated in FIGS. 6 and 7. These figures will be discussed before moving on with the description of FIG. 5.

Turning for a moment to FIG. 6, which illustrates an example flow diagram 600 illustrating calculating URL scores according to some aspects of the present disclosure. This diagram operates on the portion of the search log (e.g., search log 502) that has been selected for analysis. The portion of the search log selected for analysis comprises queries, URLs returned in response to the queries, and which URLs were clicked in response to a presented query. This portion will be referred to as the "search log" to avoid use of the rather unwieldy phrase of "portion of the search log selected for analysis."

The diagram begins with operation 602 and proceeds to operation 603 where the URLs and queries in the search log are normalized. The normalization places the URLs and queries into a standardized format. For URLs, normalization can comprise removing common prefixes in the URLs such as "http://," "www," and so forth. For queries, normalization can comprise removing and/or standardizing things like diacritics, punctuation, and so forth. The normalization of operation 603 can be optional in some embodiments.

The loop beginning at operation 604 loops over each segment.

In operation 606 an initial URL score to each query based on the underlying triggering model for the current segment. As discussed herein, the segment triggering models identify when a particular query triggers in response to a query. For example, the triggering model can produce a query score between 0 and 1 which indicates the relevance of the segment to the query. A query score closer to 1 means a segment has a higher degree of relevance to the query and a query score closer to 0 means a segment has a lower degree of relevance to the query.

Operation 606 can be performed by having the triggering model evaluate each query in the search log and produce a score indicating the degree of relevance to the segment to the query. This score can be used as the initial query score for that query.

Operation 608 determine the following values from the search logs:
1. Query Count (QC):=how many times a query appears in the search log;
2. URL Count (UC):=how many times a URL appear in the search log;
3. Query URL Count (QUC):=how many times a URL appeared in the results for a particular query.

Where items presented in the search log appear because a user interacted with the results of a search page in some way, these values actually represent:
1. Query Count (QC):=how many times a query appears in the search log where a user clicked on a URL in the results page;
2. URL Count (UC):=how many times a URL appear in the search log and the URL was clicked on;
3. Query URL Count (QUC):=how many times a URL appeared in the results for a particular query and the URL was clicked on.

Operation 610 determines a URL score for each URL in the search log by taking the sum over each query of the query score multiplied by the query URL count divided by the URL count. Written in equation form:

$$US = \sum_{query} QS\left(\frac{QUC}{UC}\right) \quad (1)$$

Where US is the URL Score for the URL, QS is the query score for the query, and QUC and UC are as defined above.

Operation 612 determines an updated Query Score for each query by taking the sum over each URL of the URL score multiplied by the query URL count divided by the query count. Written in equation form:

$$QS = \sum_{URL} US\left(\frac{QUC}{UC}\right) \quad (2)$$

As seen from equations (1) and (2), the query scores and URL scores are related. Thus, operations 610 and 612 can be repeated N times in some embodiments. Repeating equations (1) and (2) and calculating updated URL scores and updated query scores helps the scores converge on a desired level of recall for URL scores. In other words, repeating the operations causes some diffusion of scores between the query score and URL scores, expands the set of queries and URLs being considered, and will cause the later thresholding operations to more accurately represent the relevance of a segment to the query. There will be some value for N which gives better results than other values of N. The value of N that gives the best results will be dependent on the triggering model. Because the dependencies cannot be calculated on a closed form, in some embodiments the value of N for each segment is determined empirically by trying different values of N for a segment and then comparing the ultimate results of the thresholding operations discussed below in order to tune the suppression/relocation actions to correspond to what a user would expect.

The result of operations 606-612 will be a set of URL scores associated with the URLs in the search log for the current segment. Each score indicates the relevance of the segment to the associated URL. This information is stored in operation 614 and utilized as described herein.

Operation 616 selects the next segment and the entire process is repeated for the next segment. The diagram ends at operation 618.

At the end of the process described in FIG. 6, all segments have a set of URLs, each with an associated URL score indicating how relevant the segment is to the URL. However, the URLs are only those URLs that currently exist in the portion of the search log that have been evaluated. Depending on how often the process of FIG. 6 is run, there can be new URLs that arise in response to queries submitted that are not part of the search log and thus are not reflected in the data produced by the process of FIG. 6. As an example, suppose a website carries a blog or other time-based content. When a new blog post is added to the website, the blog post is added to the directory structure of: www.coolblog.org/<month>/<day>/<post serial number>. Where <month> is the month that the blog post is uploaded, <day> is the day that the blog post is uploaded, and <post serial number> is a unique ID assigned at the time the blog post is uploaded.

In this situation new URLs can be added to the website, but may not be accounted for in the search log, and thus are not represented in the data produced by the process of FIG. 6. If the data produced by FIG. 6 were to be utilized as described herein to try to assess the relevance of a new URL that had been recently added to the website, there would be no way to determine what the relevance of the segment was to the new URL.

To avoid that situation, some embodiments score subdomains in addition to, or as an alternative to, scoring individual URLs. In these embodiments, the offline process 506 can include, or be followed by, a process that scores subdomains. An example process to score subdomains is illustrated in FIG. 7.

FIG. 7 illustrates an example flow diagram 700 that accounts for new URLs in domains according to some aspects of the present disclosure. The process starts at operation 702 and proceeds to operation 704.

Operation 704 collects all URLs and groups them by sub-domain. In this discussion, no distinction is made between a top level domain and a subdomain under a top level domain.

In the example, all URLs associated with www.coolblog.org would be grouped together, along with the appropriate subdomains.

The subdomain can be at any desired level or can be for more than one level. For example, one set of subdomains can be www.coolblog.org/month_1, www.coolblog.org/month_2, and so forth. Another set of subdomains can be www.coolblog.org/month_1/day_1, www.coolblog.org/month_1/day_2, and so forth for all days in month_1. Another set of subdomains can be www.coolblog.org/month_2/day_1, www.coolblog.org/month_2/day_2, and so forth for all days in month_2. Thus, the domains and subdomains can be collected for each of the URLs.

All URLs associated with the next domain/subdomain would be grouped together and so forth.

Operation 706 calculates the URL score for each subdomain. The URL score for a subdomain can be an aggregation of the scores within the subdomain. For example, in one embodiment, the URL score for a subdomain is the average of the URL scores for all the URLs within the subdomain. Thus, the URL score for www.coolblog.org/month_2 would be the average of all the URL scores for all the URLs in that subdomain.

Operations 704 and 706 are repeated for each domain/subdomain in the data set. In the example above, a URL score would be calculated for www.coolblog.org/month_1, www.coolblog.org/month_2, www.coolblog.org/month_1/day_1, www.coolblog.org/month_1/day_2, www.coolblog.org/month_2/day_1, www.coolblog.org/month_2/day_2, and so forth for all the domains and subdomains.

Operation 708 saves the data and the process ends at operation 710. The process is repeated for each segment.

At the end of the process of FIG. 7, the result will be a set of URL scores for subdomains for each segment. The URL scores represent how relevant the segment is to the subdomain.

Returning for a moment to FIG. 5, at the end of the offline process 506 that determines URL scores, the output result will be a set of URL scores, that indicate the relation (e.g., how relevant) the URL (and/or subdomain in the embodiments where the process of FIG. 7 is used) is to a particular segment. Thought of another way, the output can be visualized as a map of each URL (and/or subdomain in the case that FIG. 7 is used) to a one dimensional array that represents the degree of relation of the URL/subdomain to each segment. For a reasonable amount of data in a search log, this can be multiple gigabytes or even terabytes of data. The set of data can, in some instances, be large enough that accessing the results in a timely manner so as to not introduce perceptible delay in the query-results page loop during the real-time phase of operation can be difficult.

To solve this issue, some embodiments can utilize a compression scheme that compresses the data and allows for quicker access to the information while not appreciably degrading the fidelity of the compressed data, which would skew the results of the real-time phase. The compression process is illustrated as 508 in FIG. 5. A representative implementation is also illustrated in FIG. 8.

Figure 8:
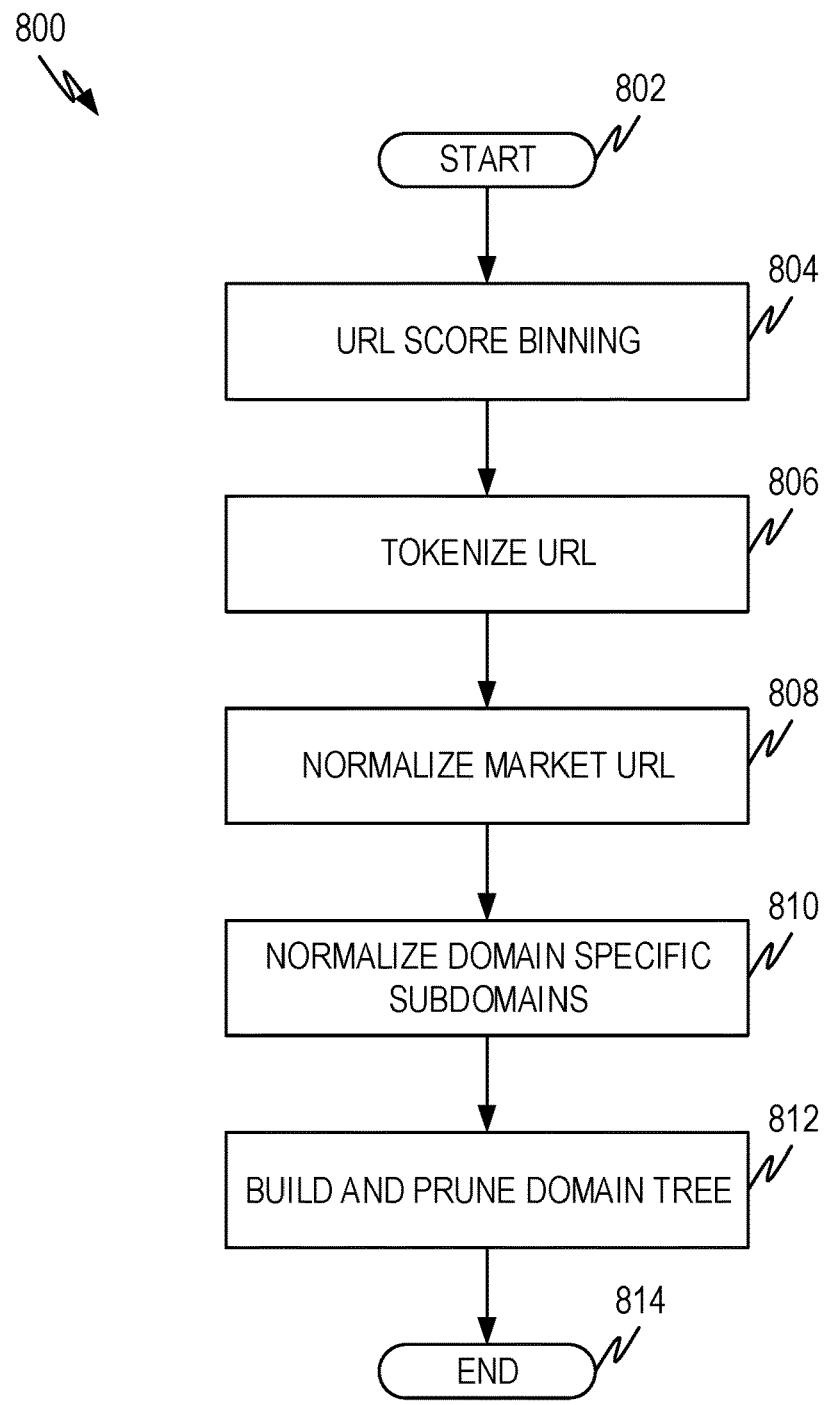
FIG. 8 illustrates an example flow diagram for compressing URL scores for real time use according to some aspects of the present disclosure.

Turning for a moment to FIG. 8, which illustrates an example flow diagram 800 for compressing URL scores for real time use according to some aspects of the present disclosure. Note that not all embodiments need to utilize all the operations of flow diagram 800. The operations are identified can be used independently from one another to gain either a greater or lesser degree of compression. The description of FIG. 8 will presume that the URL scores are by subdomain (rather than individual URL) per FIG. 7. However, in embodiments where the scores are by URL rather than by subdomain, the modifications are easy to make and those of skill in the art will be able to figure out how to modify the description of FIG. 8 to account for URL scores by URL rather than URL scores by subdomain without undue experimentation.

The process begins at operation 802 and proceeds to operation 804 where at least some URL scores are binned into particular score bins. Scores that are close to 1 and scores that are close to 0 can be replaced by 1 and 0, respectively, without introducing appreciable errors. Thus, operation 804 evaluates all the URL scores and places all subdomains with a score between 0.9 and 1 (inclusive) with a score of 1. Additionally, or alternatively, operation 804 evaluates all the URL scores and places all subdomains with a score between 0 and 0.1 (inclusive) with a score of 0.

Operation 806 tokenizes URLs to remove harder to identify and match strings and to compress and simplify URLs, subdomains and so forth. Thus, dates, years, months, days, identifiers, and other common aspects can be replaced by an appropriate token. This can have the effect of not only simplifying searching for particular dates, years, identifiers, and so forth but also standardizing the format of such data. Thus, if one website listed a date in the European convention of day-month-year and another website listed a date in the U.S. convention of month-day-year, after tokenization, both would be represented by the same token. Additionally, as known in compression theory, replacing strings with tokens can lead to less stored information depending on how tokens are selected.

Operation 808 normalizes market URLs. Thus, some web sites owners have related properties for different geographic area. Thus, ESPN® may hold espn.co.uk for the United Kingdom and espn.com for the United States. Operation 808 can conflate these different subdomain patterns so that they are normalized to a single pattern in order to compress the information as well as making it easier and/or quicker to look up particular URLs and/or subdomains during the real-time process described herein.

Operation 810 normalizes domain specific subdomain patterns. For example, one domain may utilize the pattern as subdomain.domain.com while another may use domain- .com/subdomain, such as fantasy.nfl.com as opposed to nfl.com/fantasy. Furthermore, a single website may use both patterns in different part of the domain or in related domains. Moving these to the same subdomain pattern, allows for quicker and simpler lookup during the runtime process.

Operation 812 builds a domain tree and prunes the domain tree to eliminate nodes with no or little informational value. Operation 812 builds and prunes domain trees by segment, so that each segment may have a different domain tree that captures the relevance to subdomains to that segment. A domain tree comprises the subdomains of each domain. Operation eliminates (e.g., prunes out) subdomains in the domain tree that have lower scores than their parent subdomains. A domain tree can be stored in any data structure that allows for retrieval within the real time query-response page time.

Figure 9:
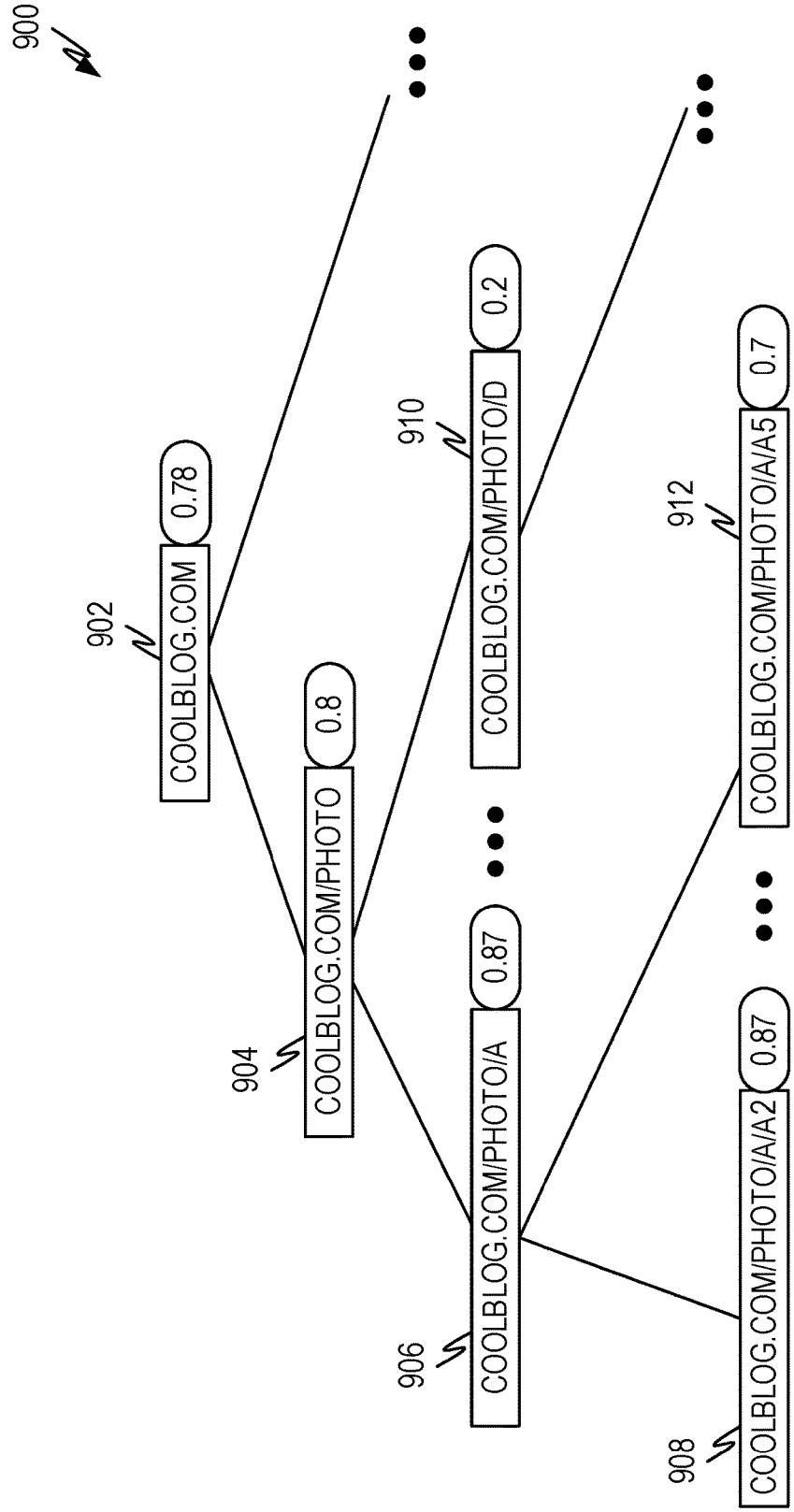
FIG. 9 illustrates a representative example of building a domain tree for a given segment according to some aspects of the present disclosure.

FIG. 9 illustrates a representative example 900 of building and pruning a domain tree for a given segment according to some aspects of the present disclosure. In this representative example, the top level domain is "coolblog.com" 902 with an associated URL score of 0.78. Top level subdomains of the domain comprise coolblog.com/photo 904 with an associated URL score of 0.8 for the segment. Subdomains of the top level subdomain comprise coolblog.com/photo/A 906, with a URL score of 0.87 and coolblog.com/photo/D 910, with a URL score of 0.2. Subdomains of coolblog.com/photo/A 906 comprise coolblog.com/photo/A/A2 908, with a URL score of 0.87 and coolblog.com/photo/A/A5 912, with a URL score of 0.7. In these subdomains, A, D, A2, and A5 can represent tokens that were used as a result of operation 806.

In pruning the domain tree, subdomains with a URL score less than the parent subdomain are eliminated from the tree. Thus, coolblog.com/photo/D 910 is eliminated because 0.2 is less than 0.8. Coolblog.com/photo/A/A5 912 is eliminated because 0.7 is less than 0.87.

The URL score for a domain can be the average of the subdomains underneath it. The pruning for the domain can follow the same rules with subdomains having a URL score less than the top level domain URL score being eliminated.

The resultant pruned domain tree can be stored in any data structure that facilitates retrieval and utilization of the information so as not to add appreciably to the query-result page turn-around time.

At the end of process of FIG. 8, the storage required to store the URL scores for use in the real-time phase can be reduced significantly. In one representative example, the storage was reduced from multiple gigabytes to less than ten megabytes. The compressed data is a set of subdomains that are related to each segment where the scores associated with the subdomain represent the relevance of the segment to the subdomain.

The compressed URL score data (or uncompressed URL score data, in embodiments that do not use compression) is stored in data store 510 for use during the real-time phase of the process.

Returning now to FIG. 5, the real-time phase of the process will now be explained. Because of the offline processing phase, we now have a set of URL scores that indicate how relevant a segment is to a particular URL. These can be used as will now be explained to determine how relevant the segment is to all the results on a search page.

During the real-time phase of the process, a user submits a query 512 to a search service 514. The search service produces a results page having one or more segments 518 and a set of search results 516 that comprise the URLs of the web pages and other resources that are part of the search results 516.

A scoring model 520 considers each segment 518 and calculates a score for that segment 522 that represents how relevant the segment is to the search results. More specifically, all the URLs in the search results are used in the calculation of the segment score 522.

The segment score can be an aggregation of all the individual URL scores in the search results. One such aggregation could be a weighted average. In another embodiment, the aggregation could be some other combination of individual URL scores. Assuming a weighted average, then the segment score is given by:

$$SegS = \frac{1}{N} \sum_{URL} W_i US_i \qquad (3)$$

Where SegS is the segment score, the summation is over all URLs in the results page, $W_i$ is the weight for the $i^{th}$ URL in the results page, $US_i$ is the URL score for the $i^{th}$ URL in the results page, and N are the number of URLs on the results page.

$US_i$ is looked up in the data store 512 where the output of the offline process is stored. $W_i$ is a weight assigned to the URL based on some criteria. For example, in one embodiment, the weights can be assigned by prominence of the URL on the results page. Search systems order search results by relevance to the query. So assigning weights based on order in the results page gives more emphasis to those URLs that are believed to be more relevant to the user's query. For example, the weights of the first K results can be assigned weights that are twice the weights of the remainder of the results. In one embodiment K is two. In other embodiments, weights can be assigned in decreasing values according to a scheme that is inversely proportional from the top of the results page. Thus, results that are farther away from the top have a lower weight value.

Looking up the URL scores, $US_i$ is performed by walking the domain tree as stored in the data store 510 and returning the URL score corresponding to the URL. Using the compressed domain tree of FIG. 9 as an example, if a URL on a results page had a corresponding subdomain of Coolblog.com/photo/A/A5 912, the score returned would be the URL score of its parent subdomain Coolblog.com/photo/A 906, such the subdomain of Coolblog.com/photo/A/A5 912 was pruned during compression.

The lookup process can proceed identifying the largest substring in the results page URL that matches a scored subdomain in the data store. Thus, "Coolblog.com/photo/A" is the largest substring in the URL "Coolblog.com/photo/A/A5" that matches a corresponding subdomain in the data store. As noted in FIG. 9, that subdomain 906 has an associated URL score of 0.87.

Any URL that does not have a subdomain within the set is assigned a URL score of 0. Thus, if the search results contain a URL of "BestBlog.com/posts/Q12" and no domain of "BestBlog.com" exists in the compressed domain tree of the data store, the score assigned would be 0, because the subdomain does not exist.

For purposes of the scoring calculation 520, the URLs that are in the set of search results 516 include those URLs that are shown on a single page of the search results. Often, if a user desires more search results that the single page produced by the search system in response to a query, the user activates a "more results" control which allows the search engine to present the next page of search results. Thus, some embodiments operate in a page-by-page manner. In other embodiments, the search results 516 can contain URLs from multiple pages of search results.

Segment decision process 524 examines the segment scores and/or other information such as flags 526 to determine what adjustments to the results page should be made prior to returning the results page to the user. At a high level this process was previously discussed in conjunction with FIG. 4.

The segment decision process 524 compares the URL score to one or more thresholds to determine what action should be taken, if any, based on the URL score and (in some embodiments) the flags 526. Adjustments that can be made based on whether the URL score for the segment exceeds one or more thresholds can include: leave the segment alone (e.g., no adjustment for the segment); relocate the segment to a less prominent location; and suppress the segment, perhaps allowing another, more relevant segment to take its place in some embodiments.

The URL score for the segment 522 indicates a relevancy of the segment to the search results 516 based on the URLs in the search results. Thus, the higher the URL score, the more relevant the segment to the search results. In some embodiments, a single threshold is used. If the URL score for the segment exceeds the threshold, the segment is left alone and remains on the results page. If the segment falls below the threshold, the segment is suppressed and removed from the results page.

In other embodiments two thresholds can be used. A lower threshold and an upper threshold. If the URL score exceeds the upper threshold, the segment is left alone and remains on the results page. If the segment is between the lower and upper thresholds, the segment is relocated to a less prominent location, such as somewhere toward the bottom of the results page. If the segment falls below the lower threshold, the segment is suppressed and removed from the results page.

Although the embodiments above indicate one or two thresholds, any number of thresholds can be used, with removal, location of a relocated segment, and/or no action taken being based on which thresholds are exceeded, if any. In such an embodiment, if a segment is relevant enough to be relocated rather than suppressed, the location can be based on the score and/or which thresholds are exceeded. The lower the score, the more removed from the top of the page the relocated segment is placed.

If a segment is suppressed and/or relocated, an appropriate flag can be set, either by the segment decision process 524 or the page adjustments process 526. As explained above, when a user reformulates a query, an appropriate flag can also be set. The flags can be used to dynamically modify the segment decision process by adjusting thresholds, adjusting the action taken for a segment, and/or so forth. For example, if a user reformulates the query, it can be presumed that the user did not find what they are looking for. If in the prior query, a segment was suppressed, the threshold for suppression can be lowered based on the reformulated query and/or suppressed segment flags so that it becomes harder to suppress the segment that was previously suppressed. Additionally, or alternatively, segments that were not previously suppressed may become easier to suppress (e.g., suppression threshold raised) because they did not contain information that the user was looking for the last time.

Other adjustments in the segment decisions can be made due to personalization based on user preferences and/or known user information. For example, if a user really likes sports, the segment decision process 524 can override suppression of the sports segment (such as by lowering the suppression threshold and/or changing the action taken decision) based on the fact that the user really likes sports. Similarly, a segment known to hold little interest to a user may become easier to suppress, such as by raising the suppression threshold. Although suppression is used as an example, relocation may also be modified.

Page adjustment process 526 makes the appropriate adjustments to the results page by suppressing, relocating, and so forth as determined by the segment decision process 524. Once all adjustments have been made, the results page 528 is returned to the user/user device.

Example Machine Architecture and Machine-Readable Medium

Figure 10:
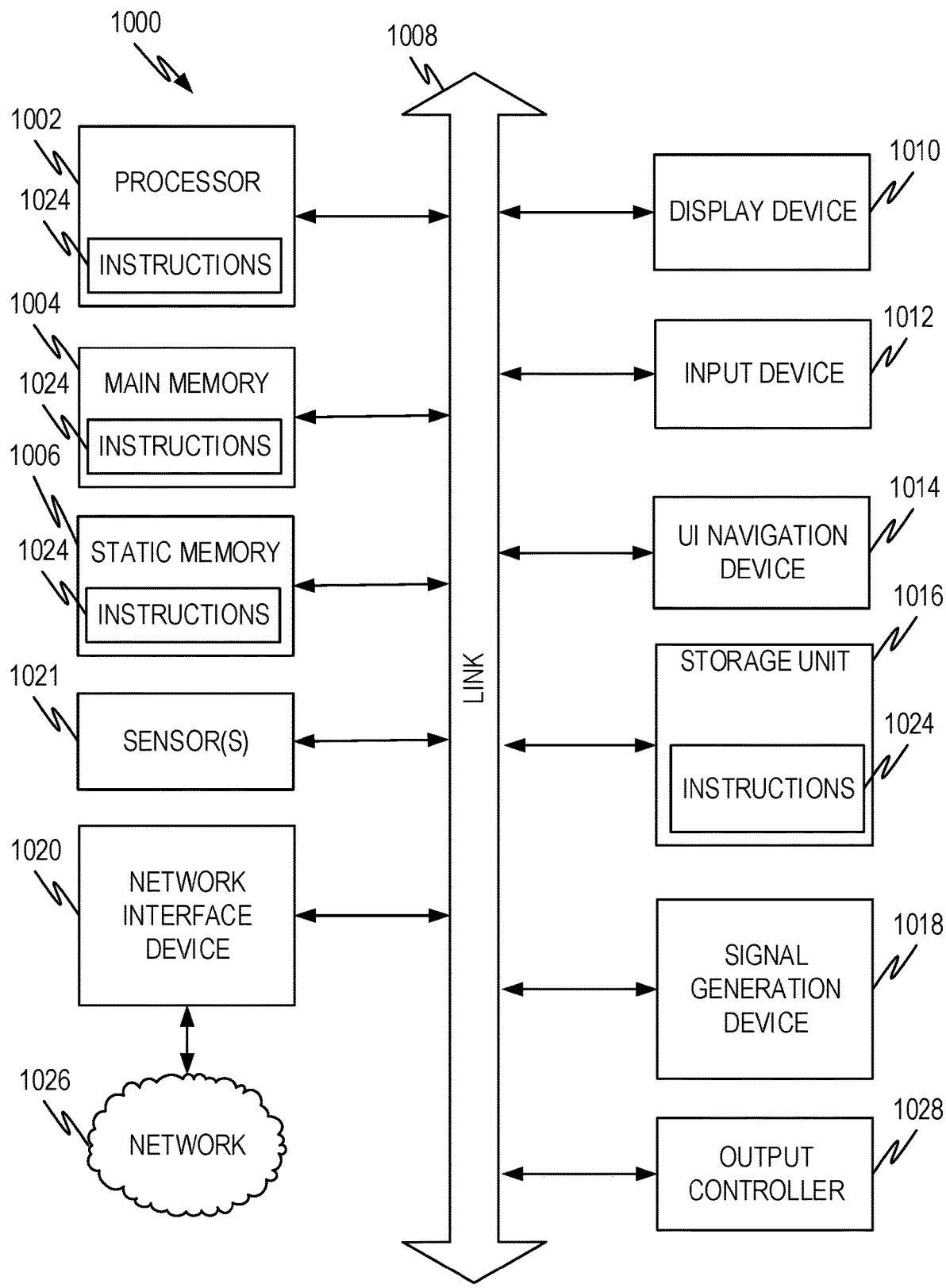
FIG. 10 illustrates a representative architecture for implementing the systems and other aspects disclosed herein or for executing the methods disclosed herein.

FIG. 10 illustrates a representative machine architecture suitable for implementing the systems and so forth or for executing the methods disclosed herein. The machine of FIG. 10 is shown as a standalone device, which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 10 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also betaken to include any collection of machines that individually or jointly execute a set (or multiple sets) of instructions to perform any one or more of the methodologies discussed herein.

The example of the machine 1000 includes at least one processor 1002 (e.g., a central processing unit (CPU), a graphics processing unit (GPU), advanced processing unit (APU), or combinations thereof), one or more memories such as a main memory 1004, a static memory 1006, or other types of memory, which communicate with each other via link 1008. Link 1008 may be a bus or other type of connection channel. The machine 1000 may include further optional aspects such as a graphics display unit 1010 comprising any type of display. The machine 1000 may also include other optional aspects such as an alphanumeric input device 1012 (e.g., a keyboard, touch screen, and so forth), a user interface (UI) navigation device 1014 (e.g., a mouse, trackball, touch device, and so forth), a storage unit 1016 (e.g., disk drive or other storage device(s)), a signal generation device 1018 (e.g., a speaker), sensor(s) 1021 (e.g., global positioning sensor, accelerometer(s), microphone(s), camera(s), and so forth), output controller 1028 (e.g., wired or wireless connection to connect and/or communicate with one or more other devices such as a universal serial bus (USB), near field communication (NFC), infrared (IR), serial/parallel bus, etc.), and a network interface device 1020 (e.g., wired and/or wireless) to connect to and/or communicate over one or more networks 1026.

Executable Instructions and Machine-Storage Medium

The various memories (i.e., 1004, 1006, and/or memory of the processor(s) 1002) and/or storage unit 1016 may store one or more sets of instructions and data structures (e.g., software) 1024 embodying or utilized by any one or more of the methodologies or functions described herein. These instructions, when executed by processor(s) 1002 cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include storage devices such as solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media specifically and unequivocally excludes carrier waves, modulated data signals, and other such transitory media, at least some of which are covered under the term "signal medium" discussed below.

Signal Medium

The term "signal medium" shall betaken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

Example Embodiments

Example 1. A machine implemented method, comprising:
receiving a set of segments and a set of results URLs that are part of a results page produced in response to a user query submitted to a search service;
for each segment in the set calculate a corresponding relevance score based on the set of results URLs;
for each segment in the set determine a corresponding action to be taken for the segment based on the corresponding relevance score, the action comprising one of:
removing the segment from the results page; and
leaving the segment on the results page in its current location;
adjusting the results page based on each determined action; and
causing presentation of the results page to a user.

Example 2. The method of example 1 further comprising:
obtaining a second set of segments, the second set of segments being a superset of the set of segments;
for each segment in the second set, determine a URL score for each URL in a set of URLs obtained from a query log, the URL score representing the relevance of the corresponding URL to the segment; and
create a segment-URL data store comprising URL scores for a subset of the second set of segments and a corresponding subset of the URLs for each segment in the subset of the second set of segments.

Example 3. The method of example 2 wherein each corresponding relevance score is an aggregation of URL scores retrieved from the segment-URL data store for a subset of URLs in the set of results URLs.

Example 4. The method of example 3 wherein the aggregation is a weighted sum.

Example 5. The method of example 4 wherein weights in the weighted sum are assigned based on the location of the corresponding URL on the results page.

Example 6. The method of example 2 wherein the URL score is based on:
a set of queries from the query log;
the set of URLs from the query log; and
a query score for each query in the set of queries and each segment in the second set indicates relevance of each query in the set of queries to each segment in the second set.

Example 7. The method of example 2 wherein the URL score is based on:
a query count derived from information in the query log;
a URL count derived from information in the query log; and
a query URL count derived from information in the query log.

Example 8. The method of example 1, 2, 3, 4, 5, 6, or 7, wherein the corresponding action is further based on user affinity for the corresponding segment.

Example 9. The method of example 1, 2, 3, 4, 5, 6, 7, or 8, wherein determining the corresponding action to be taken comprises:
creating an aggregation of the corresponding relevance scores;
comparing the aggregation to a threshold;
responsive to the aggregation exceeding the threshold, selecting leaving the segment on the results page in its current location as the corresponding action; and
responsive to the aggregation not exceeding the threshold, selecting removing the segment from the results page as the corresponding action.

Example 10. The method of example 9 further comprising adjusting the threshold based on user profile information such that a user affinity to a segment raises the threshold.

Example 11. The method of example 1, 2, 3, 4, 5, 6, 7, 8, 9, or 10, wherein each corresponding action is selected from a group consisting of:
removing the segment from the results page;
relocating the segment on the results page; and
leaving the segment on the results page in its current location.

Example 12. The method of example 11 wherein determining the corresponding action to be taken comprises:
creating an aggregation of the corresponding relevance scores;
responsive to the aggregation exceeding a first threshold, selecting relocating the segment as the corresponding action;

responsive to the aggregation exceeding a second threshold, selecting leaving the segment on the results page in its current location as the corresponding action; and responsive to the aggregation not exceeding either the first threshold or the second threshold, selecting removing the segment from the results page as the corresponding action.

Example 13. The method of example 12 further comprising adjusting the first threshold, the second threshold, or both based on user affinity for a segment such that a higher user affinity to the segment raises the first threshold, the second threshold, or both.

Example 14. An apparatus comprising means to perform a method as in any preceding example.

Example 15. Machine-readable storage including machine-readable instructions, when executed, to implement a method or realize an apparatus as in any preceding example.

Example 16. A machine implemented method, comprising:

receiving a set of segments and a set of results URLs that are part of a results page produced in response to a user query submitted to a search service;

for each segment in the set calculate a corresponding relevance score based on the set of results URLs;

for each segment in the set determine a corresponding action to be taken for the segment based on the corresponding relevance score, the action comprising one of:

removing the segment from the results page; and leaving the segment on the results page in its current location;

adjusting the results page based on each determined action; and causing presentation of the results page to a user.

Example 17. The method of example 16 further comprising:

obtaining a second set of segments, the second set of segments being a superset of the set of segments;

for each segment in the second set, determine a URL score for each URL in a set of URLs obtained from a query log, the URL score representing the relevance of the corresponding URL to the segment; and create a segment-URL data store comprising URL scores for a subset of the second set of segments and a corresponding subset of the URLs for each segment in the subset of the second set of segments.

Example 18. The method of example 17 wherein each corresponding relevance score is an aggregation of URL scores retrieved from the segment-URL data store for a subset of URLs in the set of results URLs.

Example 19. The method of example 18 wherein the aggregation is a weighted sum.

Example 20. The method of example 19 wherein weights in the weighted sum are assigned based on the location of the corresponding URL on the results page.

Example 21. The method of example 17 wherein the URL score is based on:

a set of queries from the query log;

the set of URLs from the query log; and a query score for each query in the set of queries and each segment in the second set indicates relevance of each query in the set of queries to each segment in the second set.

Example 22. The method of example 16 wherein the corresponding action is further based on user affinity for the corresponding segment.

Example 23. The method of example 16 wherein determining the corresponding action to be taken comprises:

creating an aggregation of the corresponding relevance scores;

comparing the aggregation to a threshold;

responsive to the aggregation exceeding the threshold, selecting leaving the segment on the results page in its current location as the corresponding action; and responsive to the aggregation not exceeding the threshold, selecting removing the segment from the results page as the corresponding action.

Example 24. The method of example 16 wherein each corresponding action is selected from a group consisting of:

removing the segment from the results page;

relocating the segment on the results page; and leaving the segment on the results page in its current location.

Example 25. The method of example 24 wherein determining the corresponding action to be taken comprises:

creating an aggregation of the corresponding relevance scores;

responsive to the aggregation exceeding a first threshold, selecting relocating the segment as the corresponding action;

responsive to the aggregation exceeding a second threshold, selecting leaving the segment on the results page in its current location as the corresponding action; and responsive to the aggregation not exceeding either the first threshold or the second threshold, selecting removing the segment from the results page as the corresponding action.

Example 26. A system comprising a processor and computer executable instructions, that when executed by the processor, cause the system to perform operations comprising:

receiving a set of segments and a set of results URLs that are part of a results page produced in response to a user query submitted to a search service;

for each segment in the set calculate a corresponding relevance score based on the set of results URLs;

for each segment in the set determine a corresponding action to be taken for the segment based on the corresponding relevance score, the action comprising one of:

removing the segment from the results page; and leaving the segment on the results page in its current location;

adjusting the results page based on each determined action; and causing presentation of the results page to a user.

Example 27. The system of example 26 further comprising:

obtaining a second set of segments, the second set of segments being a superset of the set of segments;

for each segment in the second set, determine a URL score for each URL in a set of URLs obtained from a query log, the URL score representing the relevance of the corresponding URL to the segment; and create a segment-URL data store comprising URL scores for a subset of the second set of segments and a corresponding subset of the URLs for each segment in the subset of the second set of segments.

Example 28. The system of example 27 wherein each corresponding relevance score is an aggregation of URL scores retrieved from the segment-URL data store for a subset of URLs in the set of results URLs.

Example 29. The system of example 26 wherein the aggregation is a weighted sum.

Example 30. The system of example 26 wherein the corresponding action is further based on user affinity for the corresponding segment.

CONCLUSION

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

What is claimed is:

1. A machine implemented method, comprising:
receiving a set of segments and a set of results uniform resource locators (URLs) that are part of a results page produced in response to a user query submitted to a search service, wherein each segment in the set comprises different types of information;
for each segment in the set, calculating a corresponding relevance score based on the set of results URLs, wherein the corresponding relevance score is indicative of relevance of a corresponding segment to a results URL in the set of results URLs;
prior to display of the results page, for each segment in the set, determining a corresponding action to be taken for the segment based on the corresponding relevance score, the action comprising one of:
removing the segment from the results page; or
leaving the segment on the results page in its current location;
adjusting the results page based on each determined action; and
causing presentation of the adjusted results page on a display to a user, wherein both the set of segments and the set of results URLs on the adjusted results page presented on the display are drawn to a same category.

2. The method of claim 1, further comprising:
obtaining a second set of segments, the second set of segments being a superset of the set of segments;
for each segment in the second set, determining a URL score for each URL in a set of URLs obtained from a query log, the URL score representing relevance of a corresponding URL to the segment; and
creating a segment-URL data store comprising URL scores for a subset of the second set of segments and a corresponding subset of the URLs for each segment in the subset of the second set of segments.

3. The method of claim 2, wherein each corresponding relevance score is an aggregation of URL scores retrieved from the segment-URL data store for a subset of URLs in the set of results URLs.

4. The method of claim 3, wherein the aggregation is a weighted sum.

5. The method of claim 4, wherein weights in the weighted sum are assigned based on a location of the corresponding URL on the results page.

6. The method of claim 2, wherein the URL score is based on:
a set of queries from the query log;
the set of URLs from the query log; and
a query score for each query in the set of queries and each segment in the second set indicating relevance of each query in the set of queries to each segment in the second set.

7. The method of claim 1, wherein the corresponding action is further based on user affinity for the corresponding segment.

8. The method of claim 1, wherein determining the corresponding action to be taken comprises:
creating an aggregation of the corresponding relevance scores;
comparing the aggregation to a threshold;
responsive to the aggregation exceeding the threshold, selecting leaving the segment on the results page in its current location as the corresponding action; and
responsive to the aggregation not exceeding the threshold, selecting removing the segment from the results page as the corresponding action.

9. The method of claim 1, wherein each corresponding action is selected from a group consisting of:
removing the segment from the results page;
relocating the segment on the results page; and
leaving the segment on the results page in its current location.

10. The method of claim 9, wherein determining the corresponding action to be taken comprises:
creating an aggregation of the corresponding relevance scores;
responsive to the aggregation exceeding a first threshold, selecting relocating the segment as the corresponding action;
responsive to the aggregation exceeding a second threshold, selecting leaving the segment on the results page in its current location as the corresponding action; and
responsive to the aggregation not exceeding either the first threshold or the second threshold, selecting removing the segment from the results page as the corresponding action.

11. A system comprising a processor and computer executable instructions, that when executed by the processor, cause the system to perform operations comprising:
receiving a set of segments and a set of results uniform resource locators (URLs) that are part of a results page produced in response to a user query submitted to a search service, wherein each segment in the set comprises different types of information;
for each segment in the set, calculating a corresponding relevance score based on the set of results URLs, wherein the corresponding relevance score is indicative of relevance of a corresponding segment to a results URL in the set of results URLs;
prior to display of the results page, for each segment in the set, determining a corresponding action to be taken for the segment based on the corresponding relevance score, the action comprising one of:
removing the segment from the results page; or
leaving the segment on the results page in its current location;
adjusting the results page based on each determined action; and
causing presentation of the adjusted results page on a display to a user, wherein both the set of segments and the set of results URLs on the adjusted results page presented on the display are drawn to a same category.

12. The system of claim 11, the operations further comprising:
obtaining a second set of segments, the second set of segments being a superset of the set of segments;
for each segment in the second set, determining a URL score for each URL in a set of URLs obtained from a query log, the URL score representing relevance of a corresponding URL to the segment; and
creating a segment-URL data store comprising URL scores for a subset of the second set of segments and a corresponding subset of the URLs for each segment in the subset of the second set of segments.

13. The system of claim 12, wherein each corresponding relevance score is an aggregation of URL scores retrieved from the segment-URL data store for a subset of URLs in the set of results URLs.

14. The system of claim 11, wherein the aggregation is a weighted sum.

15. The system of claim 14, wherein weights in the weighted sum are assigned based on a location of the corresponding URL on the results page.

16. The system of claim 11, wherein the corresponding action is further based on user affinity for the corresponding segment.

17. The system of claim 11, wherein each corresponding action is selected from a group consisting of:
   removing the segment from the results page;
   relocating the segment on the results page; and
   leaving the segment on the results page in its current location.

18. The system of claim 17, wherein determining the corresponding action to be taken comprises:
   creating an aggregation of the corresponding relevance scores;
   responsive to the aggregation exceeding a first threshold, selecting relocating the segment as the corresponding action;
   responsive to the aggregation exceeding a second threshold, selecting leaving the segment on the results page in its current location as the corresponding action; and
   responsive to the aggregation not exceeding either the first threshold or the second threshold, selecting removing the segment from the results page as the corresponding action.

19. A computer storage medium comprising executable instructions that, when executed by a processor of a machine, cause the machine to perform operations comprising:
   receiving a set of segments and a set of results uniform resource locators (URLs) that are part of a results page produced in response to a user query submitted to a search service, wherein each segment in the set comprises different types of information;
   for each segment in the set, calculating a corresponding relevance score based on the set of results URLs, wherein the corresponding relevance score is indicative of relevance of a corresponding segment to a results URL in the set of results URLs;
   prior to display of the results page, for each segment in the set, determining a corresponding action to be taken for the segment based on the corresponding relevance score, the corresponding action is selected from a group consisting of:
      removing the segment from the results page;
      relocating the segment on the results page; or
      leaving the segment on the results page in its current location;
   adjusting the results page based on each determined action; and
   causing presentation of the adjusted results page on a display to a user, wherein at least a portion of the set of segments and at least a portion of the set of results URLs on the adjusted results page presented on the display are drawn to a same category.

20. The computer storage medium of claim 19, wherein determining the corresponding action to be taken comprises:
   creating an aggregation of the corresponding relevance scores;
   responsive to the aggregation exceeding a first threshold, selecting relocating the segment as the corresponding action;
   responsive to the aggregation exceeding a second threshold, selecting leaving the segment on the results page in its current location as the corresponding action; and
   responsive to the aggregation not exceeding either the first threshold or the second threshold, selecting removing the segment from the results page as the corresponding action.

* * * * *